US008285883B2

(12) United States Patent
Bishop (10) Patent No.: US 8,285,883 B2
(45) Date of Patent: Oct. 9, 2012

(54) SOFTWARE SETTINGS FOR NETWORK DEVICES DETERMINED BY GEOPHYSICAL LOCATION

(75) Inventor: Donald M. Bishop, Highlands Ranch, CO (US)

(73) Assignee: Sandwave IP, LLC, Loveland, CO (US)

( * ) Notice: Subject to any disclaimer, the term of this patent is extended or adjusted under 35 U.S.C. 154(b) by 237 days.

(21) Appl. No.: 11/682,360

(22) Filed: Mar. 6, 2007

(65) Prior Publication Data

US 2007/0226343 A1      Sep. 27, 2007

Related U.S. Application Data

(60) Provisional application No. 60/779,860, filed on Mar. 7, 2006.

(51) Int. Cl.
*G06F 3/00* (2006.01)
*G06F 11/00* (2006.01)
*G01R 31/08* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .......................................... 710/8; 370/328
(58) Field of Classification Search ....... 710/8; 370/328
See application file for complete search history.

(56) References Cited

U.S. PATENT DOCUMENTS

| 2002/0068584 A1* | 6/2002 | Gage et al. ............. 455/456 |
| 2004/0171391 A1* | 9/2004 | Muramatsu ............. 455/456.6 |
| 2008/0133665 A1* | 6/2008 | Lybeck et al. ............. 709/204 |
| 2008/0155094 A1* | 6/2008 | Roese et al. ............. 709/224 |

OTHER PUBLICATIONS

"3rd Generation Partnership Project; Technical Specification Group Services Aspects; Functional Stage 2 Description of Location Services (LCS) Release 7", 3GPP TS 23.271 v7.3.0 Mar. 24, 2005.
"3rd Generation Partnership Project; Technical Specification Group Services and System Aspects; Vocabulary for 3GPP Specifications (Release 5)", 3GPP TR 21.905 v5.9.0 Mar. 24, 2005.
"Why Does My Router Lose Its Configuration During Reboot", undated, pp. 1-4, downloaded July 19, 2010, http://www.cisco.com/application/pdf/paws/6201/lose_config_6201.pdf.

* cited by examiner

*Primary Examiner* — Chun-Kuan Lee
(74) *Attorney, Agent, or Firm* — Russell S. Krajec; Krajec Patent Offices, LLC (57) ABSTRACT

A network-connected device may receive specific software configuration settings based on geophysical location information known about the device. The geophysical location information may come from a global positioning system (GPS) receiver or any other mechanism for determining a location for the device. The software settings may be stored in a volatile memory so that when the device is disconnected from a power source, it does not contain the specific settings required for the device to operate. In another embodiment, localization settings to meet regulatory requirements or other local configuration may be downloaded to the device based on the geophysical location information.

20 Claims, 6 Drawing Sheets

SOFTWARE SETTINGS FOR NETWORK DEVICES DETERMINED BY GEOPHYSICAL LOCATION

CROSS REFERENCE TO RELATED APPLICATIONS

This application claims priority to and benefit of U.S. Provisional Patent Application Ser. No. 60/779,860 filed 7 Mar. 2006 by Donald M. Bishop entitled "Software Settings Based on Geophysical Location", which is hereby incorporated by reference for all it discloses and teaches.

BACKGROUND

Many communications networks have devices located in many different physical locations. Many of these devices require different configurations based on where the device is installed.

In other situations, some network-enabled devices may be installed and used in many different portions of the globe. Local customizations may be necessary to comply with various regulatory requirements or specific functionality required.

Setting such configurations or localization parameters can be a time consuming and error prone process when done in a manual fashion.

SUMMARY

A network-connected device may receive specific software configuration settings based on geophysical location information known about the device. The geophysical location information may come from a global positioning system (GPS) receiver integral to the device or any other mechanism for determining a location for the device. The software settings may be stored in a volatile memory so that when the device is disconnected from a power source, it does not contain the specific settings required for the device to operate. In another embodiment, localization settings to meet regulatory requirements or other local configuration, for example, may be downloaded to the device based on the geophysical location information.

DETAILED DESCRIPTION

Specific embodiments of the invention are described in detail below. The embodiments were selected to illustrate various features of the invention, but should not be considered to limit the invention to the embodiments described, as the invention is susceptible to various modifications and alternative forms. The invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

Figure 1:
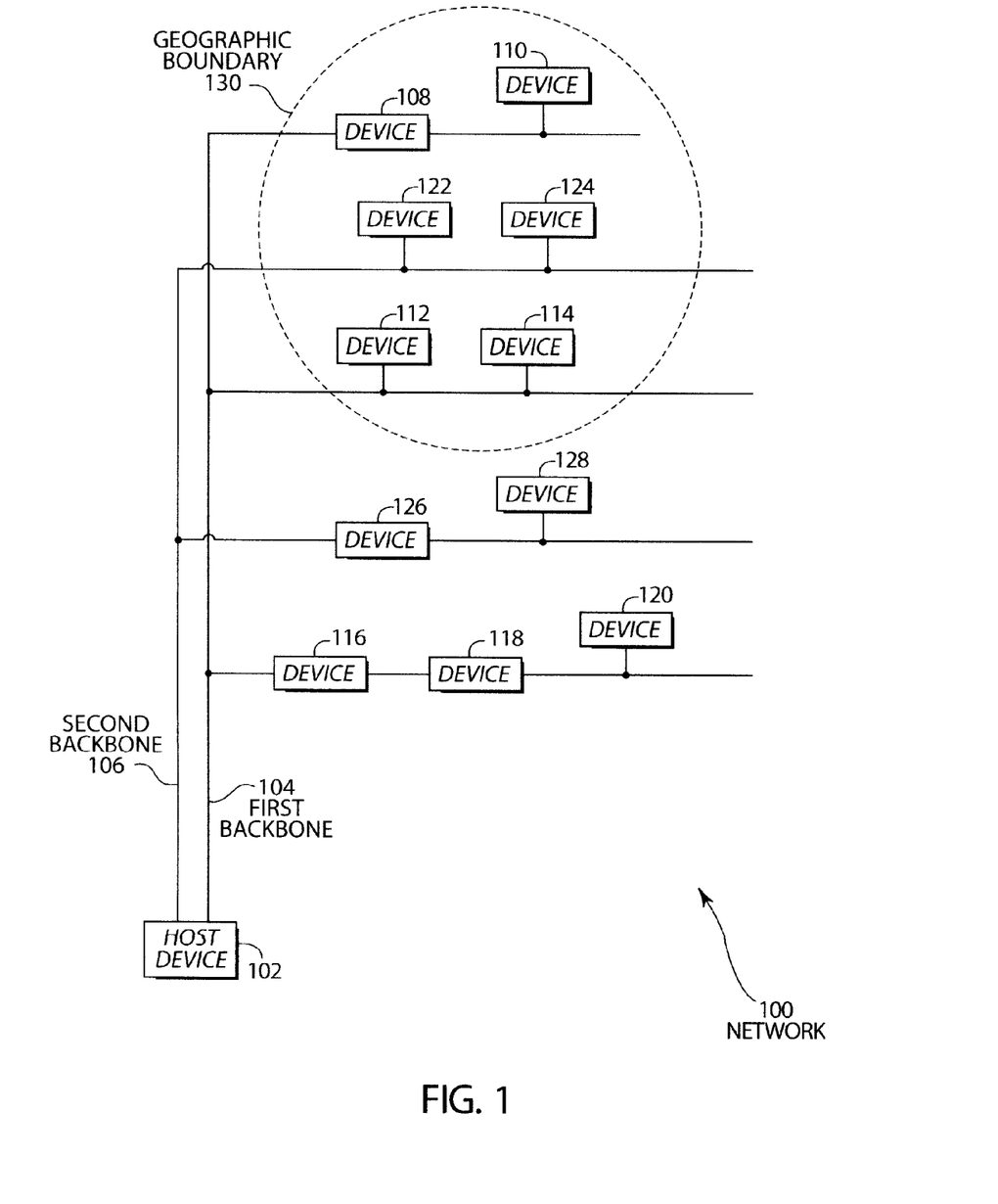
FIG. 1 is a diagrammatic illustration of an embodiment showing a network with dispersed network devices and having a geographic boundary encircling a subset of the devices.

FIG. 1 illustrates an embodiment 100 showing a network with a geographic boundary. A host device 102 has two network backbones 104 and 106. Devices 108, 110, 112, 114, 116, 118, and 120 are attached to the first network backbone 104, while devices 122, 124, 126, and 128 are attached to the second network backbone 106. The geographic boundary 130 includes devices 108, 110, 112, 114, 122, and 124.

In the embodiment 100, devices that are within the geographic boundary 130 may be selected and have software settings updated or changed based on their geographic location. In many networks, devices attached to the network may have physical proximity but may be located a long way apart from the network perspective. For example, devices 114 and 124 may be located very near each other physically, but may be located very distant from each other from the network's perspective. A communication from device 114 to device 124 would travel down the first backbone 104, through the host device 102, and back through the second backbone 106. From a network operator's perspective, the two devices are very far apart. However, from a user's perspective, the devices are neighbors.

Many applications may use the physical proximity of the two devices. For example, both devices may be wireless devices that may use coordinated radio transmissions to broadcast to a subscriber's mobile device. In another example, the two devices may be configured the same manner because they may provide overlapping services to subscribers in the area.

The present embodiment enables devices to be selected and modified based on the geographic location. Each device on the network may have a Global Positioning System (GPS) receiver or other mechanism by which the location of the device is known, even when the devices are fixed mounted. By having this information, the network may be operated, maintained, and specialized services may be delivered by using the physical location of the devices as a criteria rather than network addressing. Devices may be searched, sorted, and selected using geographic locations for modifications and changes that may be made through software settings.

In a coarse usage of the embodiment, a device may be attached to the network, determine in which time zone and country in which it is located, and download localization software so that the device performs in a user friendly fashion. In a more precise localization usage of the embodiment, all of the devices in a specific business district of a town or the floor of a building may be configured to provide access to a certain group of subscribers.

The embodiment may be useful for rolling out new versions of software, where one area may be updated, tested, and debugged at a particular time, rather than rolling out a large upgrade over the entire network at once. In another use, the embodiment may be used for regulating traffic flow in an area. For example, internet telephony calls in the geographic area 130 may be prioritized for emergency responders at a structure fire while other data traffic in the geographic area 130 may be restricted so that the emergency communications go through.

The devices may be network devices such as routers, amplifiers, switches, and other devices along the network that facilitate, monitor, and control network traffic. The devices may be personal computers that perform various functions on the network, from monitoring weather to performing word processing, data storage and retrieval, and other functions. The devices may also include servers that handle websites, databases, or any other centralized processing requirements. In some cases, the devices may be network interface points where a subscriber may interface to the network for telephony, internet access, or any other electronic communication.

Figure 2:
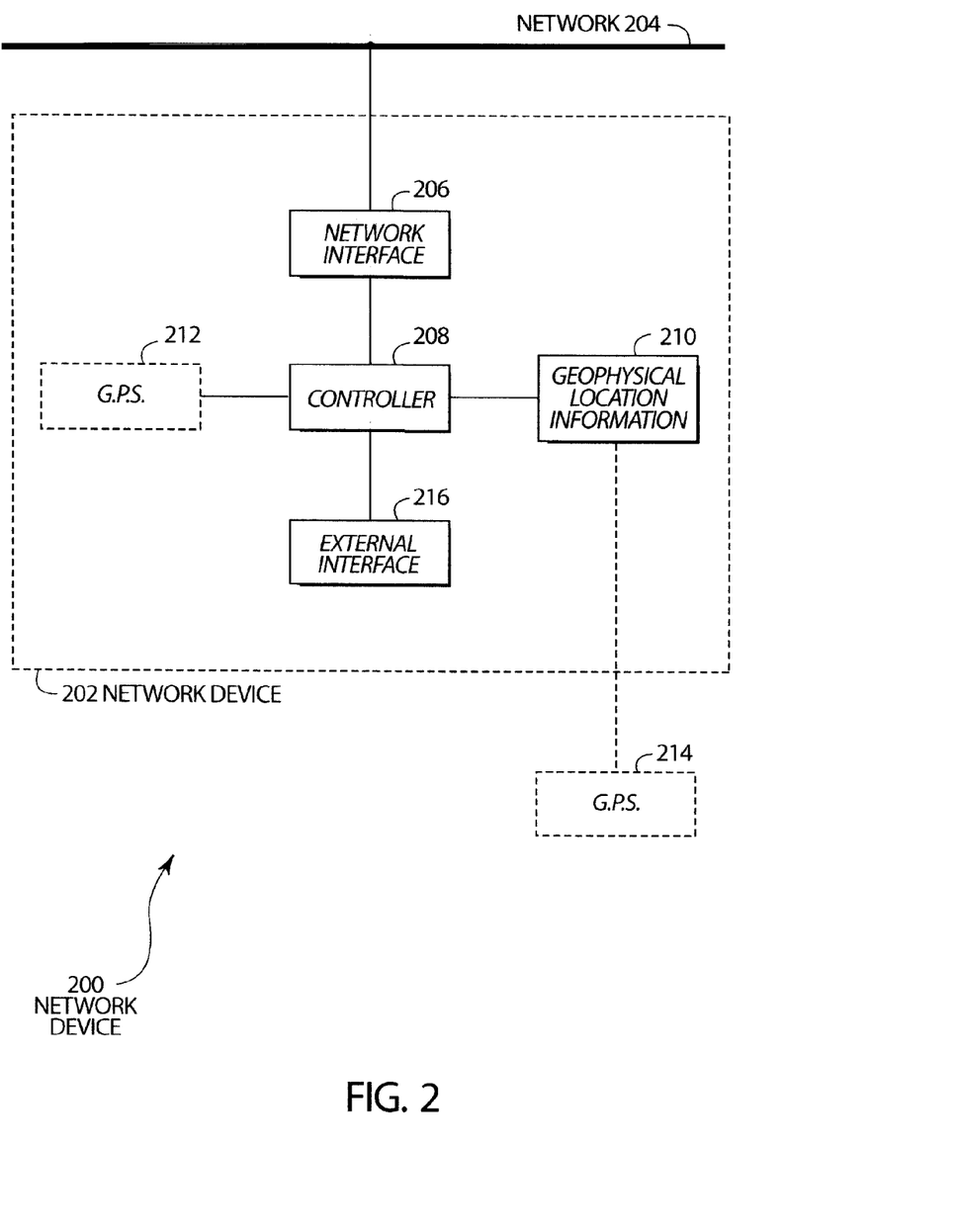
FIG. 2 is a diagrammatic illustration of an embodiment showing a network-connected device having internal geophysical location information storage.

FIG. 2 is a diagrammatic illustration of an embodiment 200 showing a network device. The device 202 is attached to a network 204 through a network interface 206. The controller may read geophysical location information 210 that may be provided through a built-in Global Positioning System (GPS) receiver 212 or a removable GPS receiver 214. The controller 208 may have an external interface 216 for connecting to other devices.

The embodiment 200 may be any type of network-connected device that contains a GPS receiver or other mechanism for determining physical location. In many cases, the device 202 may be fixed mounted while in other cases, the device 202 may be a mobile device. When the device 202 is fixed mounted, the network interface 206 may be a wired or wireless connection to the network 204. If the device 202 is a mobile device, the network interface 206 may be any type of wireless connection. In a wired connection, the network may be an Ethernet or other network. In a wireless connection, the network interface 206 may comprise a radio transceiver, infrared transceiver, microwave transceiver, acoustic coupler, or any other type of wireless network connection.

The geophysical location information 210 may be provided through any mechanism capable of determining a useful geophysical location. A GPS receiver 212 may be included in the design of the network device 202 and may be able to accurately determine the position of the device 202 within several feet. In other embodiments, the controller 208 may be able to determine the geophysical location of the device 202 through triangulation with other neighboring devices connected to the network. In some such embodiments, the devices may communicate through radio transmissions in lieu or in addition to communicating over the network 204.

The geophysical location information 210 may be provided through a detachable GPS receiver 214. A maintenance technician, for example, may connect the detachable GPS receiver 214 to the network device 202 during installation in order to have the geophysical location information 210 transferred from the detachable GPS receiver 214. The geophysical location information 210 may be stored in a non-volatile memory and may be used by network operators to determine the previous physical location of a device when the device is brought in for service.

The geophysical location information 210 may be stored in volatile memory. In such a case, the geophysical location information 210 may be reprogrammed each time the device is reconnected to a power supply or network. Such an embodiment may be useful to combat devices from being stolen and reattached to the network in an unauthorized manner, since the device may be programmed to require the GPS receiver 214 to upload the geophysical location information 210 before operating on the network.

The network device 202 may have any type of external interface 216. In some cases, the external interface 216 may be a user interface with a graphical user interface operable on a terminal device. One such embodiment may be a network-attached personal computer. In other cases, the external interface 216 may include various sensors, monitors, or other measurement devices. In still other cases, the external interface 216 may be a second network connection, such as a network router, switch, or relay device that may join two portions of the network 204 together. In yet other cases, the external interface 216 may be a network access point for other devices, such as wireless or wired connections to subscriber devices.

Figure 3:
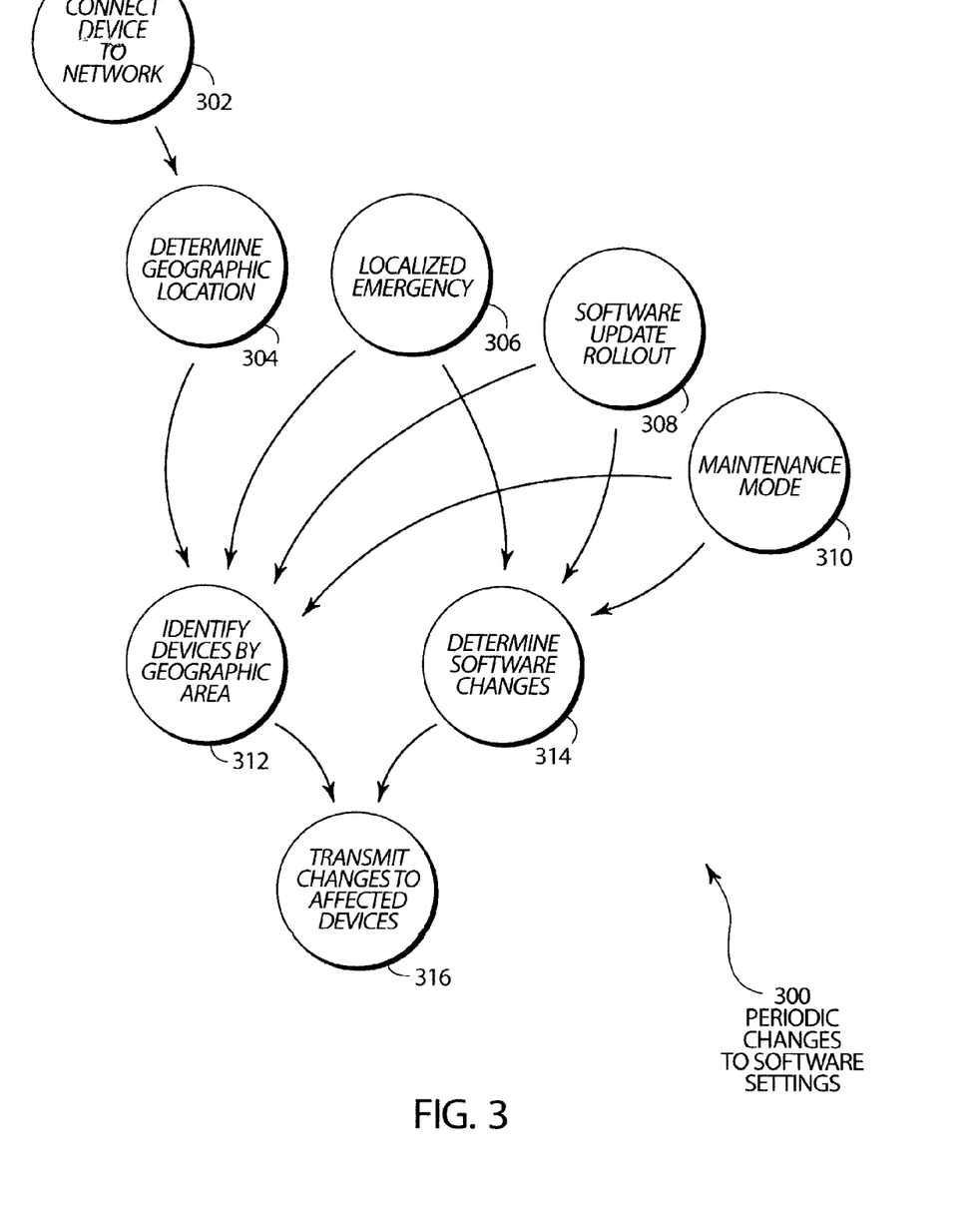
FIG. 3 is a diagrammatic illustration of an embodiment showing periodic changes to software settings using geographic information about network connected devices.

FIG. 3 illustrates an embodiment 300 of a diagram showing the periodic changes to software settings that may be made. When a device is attached to a network in block 302, the geographic location of the device is determined in block 304. Various events, such as a localized emergency in block 306, a software update rollout in block 308, or a maintenance mode in block 310 may trigger a localized software change. The affected devices are identified in block 312 and the software changes are determined in block 314. The changes are transmitted to the affected devices in block 316.

There are many different reasons for making localized changes to software on network devices. In each case, changes to the devices may be downloaded to devices that are in a specific geographic area. The events that drive the changes may be temporary, such as responding to an emergency situation or for maintenance, or may be permanent, such as updating the software deployed on the network.

The devices may operate in conjunction with each other. For example, a network of wireless transmitters connected to a wired network backbone may operate in a synchronized basis. In such an example, the neighboring transmitters may synchronize some transmissions with each other. The synchronized transmissions may not operate properly when the software on each transmitter is of a different revision. Thus, the devices in a geographic area are identified using the geophysical location information for each device, and that group of devices may be changed or updated together.

A localized emergency such as in block 306 may be any situation where the operation of the network may be temporarily changed. For example, a data network that handles voice transmissions may be configured to give priority to voice traffic in certain situations. In one such example, voice traffic may be prioritized from emergency services organizations such as fire or police that are responding to a fire in a section of a city. The affected neighborhoods may be identified, devices within those neighborhoods selected, and temporary commands may be relayed to the devices so that the emergency voice communications are sent with high priority. In another example, a network may be configured to route high volumes of data traffic in and out of a business section of a city during the day and reconfigured to route high volumes of data traffic into residential areas during the evening.

Software rollouts may be performed by identifying devices in a specific geographic area then updating those devices. A small area may be selected and have software downloaded to those devices. After the software is verified, another small area may be identified and software downloaded. Often during large software upgrades, a network may become saturated by many devices downloading a software upgrade simultaneously. By doing the upgrades in small areas, network traffic may be better controlled during the upgrade process. Because the upgrades may be isolated to a specific geographic location, subscriber difficulties or problems along the network that relate to the software update may be easier to diagnose.

Network maintenance may be performed by identifying devices in a specific geographic area and making temporary or permanent changes to the software resident in those devices. For example, a specific geographic area may be set aside for performance testing. Devices in the area may be configured by software to execute specific portions of a performance test. The devices may be taken offline to perform such tests or the tests may be performed in addition to the normal operating functions of the devices.

Figure 4:
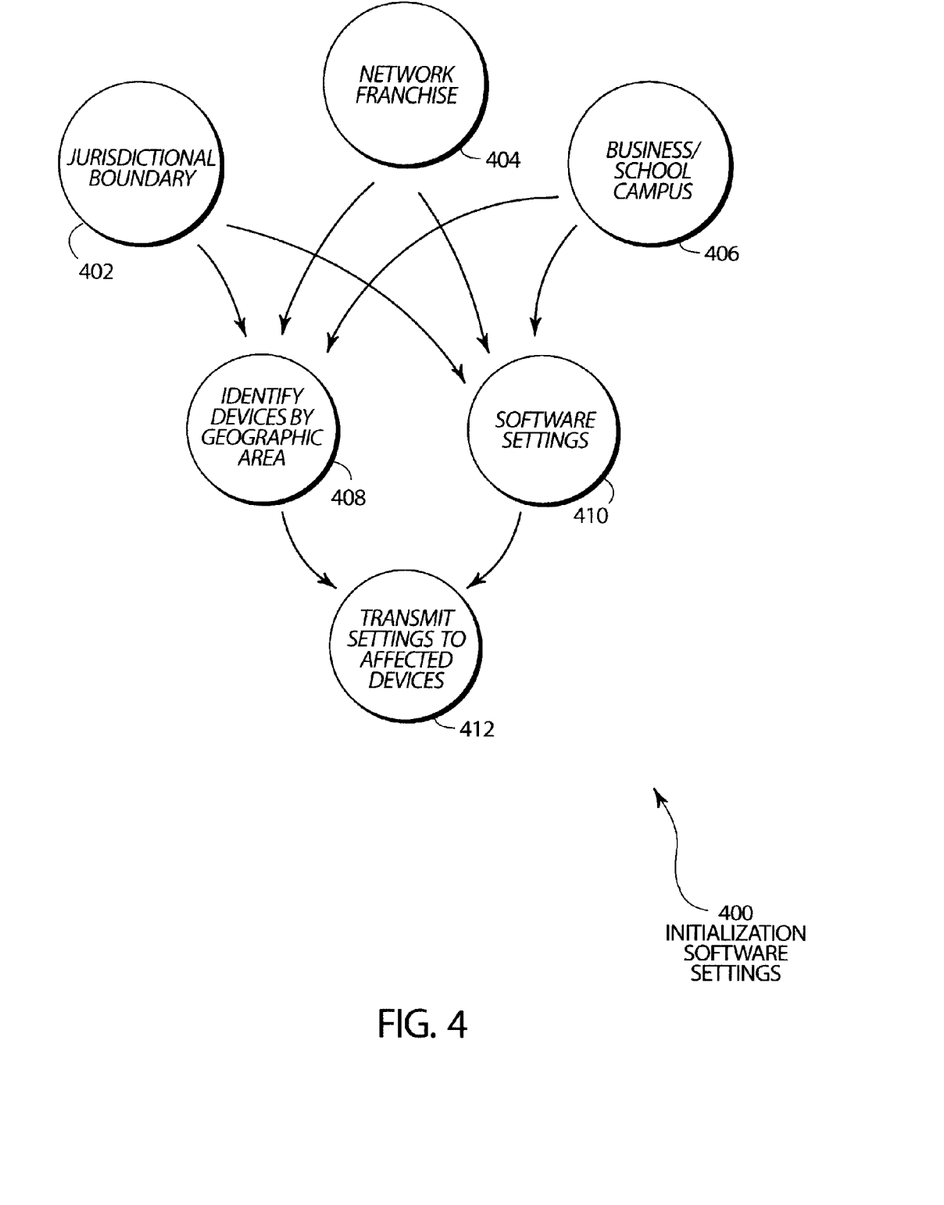
FIG. 4 is a diagrammatic illustration of an embodiment showing initialization software settings using geographic information about network connected devices.

FIG. 4 illustrates an embodiment 400 showing geographic selections of initialization software settings. Jurisdictional boundaries in block 402, network franchise boundaries in block 404, and business or school boundaries in block 406 are used to identify devices by geographic area in block 408 and determine software settings in block 410. The geographic boundaries and software settings are transmitted and installed in block 412.

Embodiment 400 illustrates just some of the geographic boundaries that may be used to make software changes to devices on a network. Jurisdictional boundaries in block 402 may relate to regulatory settings or settings that relate to the gross geography of the device location. For example, the jurisdictional boundaries may require that a device use a specific encryption standard or for a radio transmitter to operate with a specific maximum power level or a particular transmission protocol. In another example, the geophysical location may be used to determine the time zone and language preferences for that area.

When a device is located within a network franchise area in block 404, network-specific settings may be installed. These may include software applications that are loaded on the device, network-specific login screens or other changes to a user interface that relate to the network. These may also include communication settings that enable the device to communicate with other devices on the network.

Devices that service a business or school campus in block 406 may have particular settings that are customized for a specific user group. For example, login requirements or content restrictions may be established for the devices. In another example, a business may purchase a subscription guaranteeing a specific bandwidth. The network devices that service the business may be specially configured to meet the bandwidth requirements.

In some cases, a device may be connected to the network and make a temporary connection to a server. The server may determine the geophysical location of the device and determine the appropriate settings to download to the device. In another case, a device may connect to the network, determine its geophysical location, and request or fetch specific software to be downloaded. In some cases, the device may query a database that contains the specific software to be downloaded to the device in order to determine what software to download.

Figure 5:
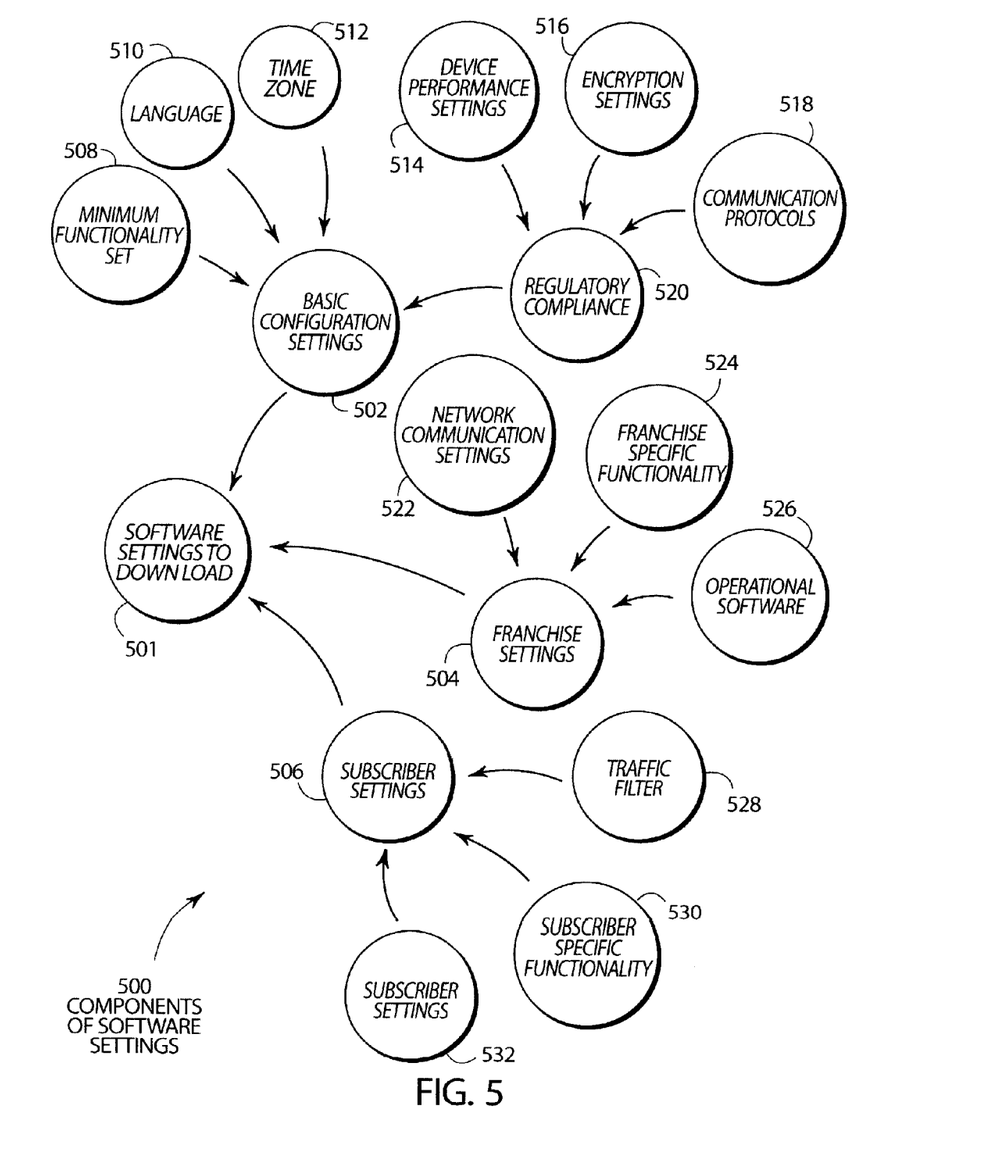
FIG. 5 is a diagrammatic illustration of an embodiment showing components of the software settings that may be modified for devices within a specific geographic area.

FIG. 5 illustrates an embodiment 500 of various software settings that may be downloaded to a network device. The downloaded software settings in block 501 may comprise basic configuration settings in block 502, franchise settings in block 504, and subscriber settings in block 506. Basic configuration settings in block 502 may comprise a minimum functionality set 508, language 510, and time zone settings 512. It may also comprise regulatory compliance settings 520 that comprise device performance settings 514, encryption settings 516, and communication protocols 518. The franchise settings 504 may comprise network communications settings 522, franchise specific functionality 524, and operational software 526. The subscriber settings 506 may comprise a traffic filter 528, subscriber-specific functionality 530, and various subscription settings 532.

The embodiment 500 illustrates many of the different settings that may be dependent on the geophysical location of a device attached to a network. In some embodiments, the software settings may be downloaded on initial installation of the device on the network, while in other embodiments, the software settings may change over time. In each embodiment, the geophysical location of the device is used at least in part to select the appropriate downloaded software to the device.

As part of the basic configuration settings 502, a device may have a certain minimum functionality set downloaded and installed. For example, a brand-new device may be attached to a network. Upon initial power up and communication over the network, the device may determine its geophysical location and install a minimum functionality set of software to provide at least rudimentary communication along the network. The device may be capable of installing appropriate software so that it may contact a server through the network to determine if any additional software is required to be installed on the device. The additional software may comprise other basic configuration settings 502, franchise specific settings 504, and/or subscriber settings 506.

The device may be capable of determining its geophysical location and selecting an appropriate language 510 and time zone 512 settings. Many devices are deployed all around the globe, and various embodiments may self-detect the geophysical location and provide communication in a native tongue to a likely network operator. For example, a device deployed in Denver, Colo. may detect its location and configure itself to have a user interface in the English language and set the clock to a Mountain time zone setting. The same device deployed in Finland may self-configure to a Finnish language interface and with the appropriate time zone for Finland.

The regulatory compliance settings 520 may comprise any performance settings for a device that may be regulated by a particular jurisdiction. Device performance settings 514 may include power level and channel settings for a radio transceiver, for example. Encryption settings 516 may be regulated by jurisdiction such that only specific encryption algorithms may be used in certain geographic areas. Similarly, various countries or geographic regions may have specific communication protocols in use. The communication protocols may be for communications along the network backbone or for communications that originate with the device, such as in the case of a wireless access point where the wireless communication standards may be different in the United States and in Europe, for example.

The franchise settings 504 may comprise any settings that may be specially set by a particular franchise or service provider. For example, the necessary parameters to communicate on the network backbone may comprise the addresses of various routers, servers, and gateways along the network in addition to protocol settings, authorization keys, or other parameters used within the network. In addition, the franchise-specific functionality 524 may include software that is customized for the franchise, such as having the franchise name, logo, or customized user interface on an otherwise generic software application. Franchise-specific settings 504 may include certain software applications 526 that are made available to or licensed for all users of the network. For example, a license for an anti-virus computer application may extend to all personal computers on the network. Such an application with the appropriate license may be downloaded to all personal computers within the geographic borders of the franchise.

The subscriber settings 506 may similarly comprise settings that are tailored to specific subscribers based on the geographic location of the subscriber devices or network devices that support certain subscribers. For example, if a network services a group of business subscribers, the devices along the network that handle the subscriber's traffic may be configured to handle the subscriber's specific needs. In such an example, the routers, servers, and network communication devices within a specific geographic area may be configured to handle the business subscriber's traffic in a specific way, such as allocating bandwidth, prioritizing different types of data, using encryption, filtering traffic, or other functions that may be requested of a specific subscriber.

Additionally, end user terminals on the network may be outfitted with specific application software that are used by the end users. Personal computers attached to the network, for example, may be loaded with specific software applications based on their geographic location and a specific subscriber's set up.

The subscriber settings 506 may include traffic filtering, where certain traffic is permitted or denied. For example, a network device that handles traffic to and from a school campus may have content filtering installed to eliminate pornography or other unwanted content. In another example, voice data from a business may be given a high priority to ensure quality of service for voice calls.

Subscriber specific functionality 530 may include any type of software application for a specific subscriber. The software application may be a word processing, spreadsheet program, or some application directly useable by the subscriber. The software application may also be an application that runs in the background or is not directly used by the subscriber. Such an example may include anti-virus software, traffic monitoring software, settings for proxies or other network operational software specific to the geographic location from where the subscriber operates, or any similar application.

Subscriber settings 532 may include any settings that are specific to those subscribers in a geographic area. Examples may include addresses for name servers, proxies, or other settings specially tailored for the subscribers in a geographic area.

Figure 6:
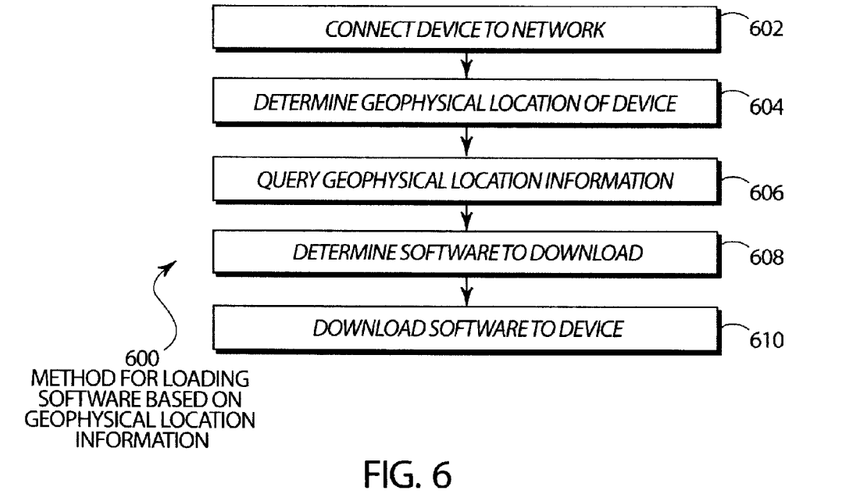
FIG. 6 is a flowchart illustration of an embodiment showing a method for loading software based on geophysical location information.

FIG. 6 is a flowchart illustration of an embodiment 600 showing a method for loading software based on geophysical location information. The device is connected to the network in block 602, and the geophysical location of the device is determined in block 604. The geophysical location information is queried in block 606 to determine the software to download in block 608. The software is downloaded in block 610.

The embodiment 600 illustrates a method for loading some initial software settings, applications, or other configurable changes for a device when it is initially installed onto a network. When the device is connected, the geophysical location of the device is determined and specific software settings are downloaded to the device based on the geophysical location. In some instances, the embodiment 600 may be used when a device is rebooted or reinitialized.

The device may be connected to the network in block 602 may any method. The device may be physically connected by installing a network cable into a network interface and powering up the device. In other instances, the device may establish a wireless connection to the network.

The geophysical location of the device in block 604 may be determined by any mechanism appropriate. An integral GPS receiver may determine the geophysical location of the device in some cases, while in other cases, the geophysical location may be determined by establishing communications with other devices with known geophysical locations, measuring the approximate distance to the other devices, and resolving a geophysical location for the device through triangulation.

The geophysical location information is queried in block 606. In some instances, a host device may query the geophysical location information in block 606 during the process of establishing communication with the network. The host device may perform a query on a database or otherwise determine the software to download in block 608.

In other instances, the device itself may determine the software to download in block 608. The device may establish connection to the internet and query a remote database that contains the appropriate settings for the device in the particular geophysical location. In another embodiment, the device may contain an internal database or set of settings that are appropriate for different geophysical locations. For example, the device may contain internal settings for each time zone, but may query a remote host device to determine the appropriate software settings for a particular country or host network.

The software to download in block 608 may range from a simple bit setting for a specific configuration to extensive software applications that are used by the device. In some cases, the software may include data files that may be used by other devices connected to the network.

Figure 7:
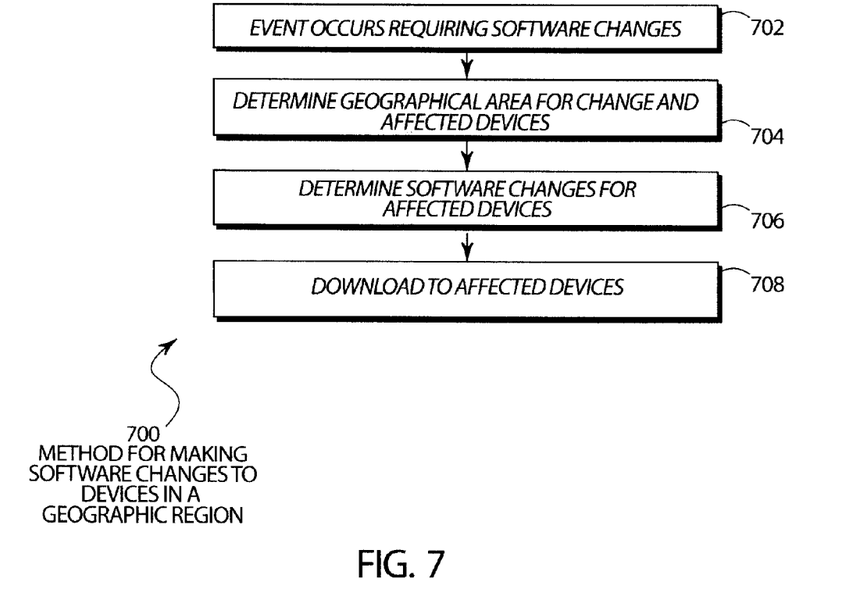
FIG. 7 is a flowchart illustration of an embodiment showing a method for making software changes to devices in a geographic region.

FIG. 7 is a flowchart illustration of an embodiment 700 showing a method for making software changes to devices in a geographic region. An event occurs requiring software changes in block 702. The geographic area for the change and the affected devices is determined in block 704 and the software changes for the devices within the area are determined in block 706. The software changes are downloaded in block 708.

Embodiment 700 illustrates a method whereby a group of network devices may be selected and changed using the geophysical location properties. In some cases, the host device on the network may initiate the change, while in other cases, one of the network devices may initiate the change.

For example, a host device may be used by a maintenance technician to select the devices within a defined geographic area and perform a software upgrade to those devices. In another example, a network device such as a wireless access point used for voice and data services may receive a user request for emergency voice services in a local geographic area. The network device may initiate a request for other devices within a defined geographic area to reconfigure so that the emergency voice services may have a high priority on the network.

An event requiring software changes in block 702 may comprise any type of event, including those events discussed in embodiment 300. Localized emergencies, software rollouts, maintenance issues, and other events may trigger a software change.

The affected devices in block 704 may be determined in several different ways. In one embodiment, a host device may maintain a database of the various network devices and the geophysical location information for each device. When a query for a specific geographic area is executed, the database may return a list of the devices within the area.

In another embodiment, a broadcast message may be transmitted to all or a portion of the devices on the network. The broadcast message may request a reply by devices within a specific geophysical area. Each device within the area may receive the broadcast message, compare the geophysical area defined in the message with the geophysical location information stored within the device, and transmit a reply or perform the software change based on the broadcast message.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A host device comprising:
a network connection configured to communicate with a first device connected to said network, said first device being a network routing device and having a volatile memory storage; and
a controller configured to perform a method comprising:
connecting to said first device over said network, said first device having geophysical location information;
receiving said geophysical location information about said first device;
determining a set of software settings for said first device based on said geophysical location;
transmitting said set of software settings to said host device from said first device;
causing said first device to store at least a portion of said software settings in said volatile memory storage such that when power is removed from said first device, said portion of said software settings are erased from said volatile memory storage;
determining wherein said method is performed in response to a localized emergency;
determining a boundary for said localized emergency
determining that said first device is within said boundary; and
determining at least one software setting for said first device based on said localized emergency and said boundary.

2. The host device of claim 1 wherein said method further comprises:
causing said first device to store a second portion of said set of software settings in non-volatile memory storage.

3. The host device of claim 1, said method performed by said controller further comprising:
determining a jurisdictional boundary with respect to said geophysical location; and
determining at least one software setting for said first device based on said jurisdictional boundary.

4. The host device of claim 3, said at least one software setting comprising a regulatory setting for said first device.

5. The host device of claim 4, said regulatory setting comprising an encryption standard.

6. The host device of claim 4, said regulatory setting comprising a maximum power level.

7. The host device of claim 4, said regulatory setting comprising a transmission protocol.

8. The host device of claim 1, said method performed by said controller further comprising:
   determining a network franchise boundary; and
   determining at least one software setting for said first device based on said network franchise boundary.

9. The host device of claim 8, said at least one software setting comprising software application to be loaded into said host device.

10. The host device of claim 8, said at least one software setting comprising a network-specific login screen.

11. The host device of claim 8, said at least one software setting comprising a change to a user interface.

12. The host device of claim 1, said method performed by said controller further comprising:
    determining a campus boundary; and
    determining at least one software setting for said first device based on said campus boundary.

13. The host device of claim 12, said at least one software setting comprising a software setting customized for a specific user group.

14. The host device of claim 12, said at least one software setting comprising a bandwidth specification.

15. The host device of claim 12, said at least one software setting comprising content filtering.

16. The host device of claim 12, said at least one software setting comprising quality of service settings.

17. The host device of claim 1 wherein said method is performed in response to testing on said network.

18. The host device of claim 1 wherein said method is performed in order to update devices on said network.

19. The host device of claim 1, said at least one software setting comprising prioritizing voice traffic.

20. The host device of claim 19, said prioritizing comprising setting emergency responder's voice traffic to high priority.

* * * * *